(12) United States Patent
Boyd

(10) Patent No.: US 9,935,727 B2
(45) Date of Patent: *Apr. 3, 2018

(54) METHOD AND SYSTEM FOR SCHEDULING CASCADED PON

(71) Applicant: Tibit Communications, Inc., Petaluma, CA (US)

(72) Inventor: Edward W. Boyd, Petaluma, CA (US)

(73) Assignee: TIBIT COMMUNICATIONS, INC., Petaluma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/404,066

(22) Filed: Jan. 11, 2017

(65) Prior Publication Data

US 2017/0126351 A1  May 4, 2017

Related U.S. Application Data

(63) Continuation of application No. 14/684,164, filed on Apr. 10, 2015, now Pat. No. 9,577,758.

(60) Provisional application No. 61/978,137, filed on Apr. 10, 2014.

(51) Int. Cl.
| | |
|---|---|
| *H04B 10/27* | (2013.01) |
| *H04J 14/00* | (2006.01) |
| *H04J 14/02* | (2006.01) |
| *H04B 10/40* | (2013.01) |
| *H04B 10/80* | (2013.01) |

(52) U.S. Cl.
CPC .......... *H04J 14/0239* (2013.01); *H04B 10/40* (2013.01); *H04B 10/801* (2013.01); *H04J 14/0282* (2013.01)

(58) Field of Classification Search
CPC .... H04J 14/0239; H04J 14/0282; H04B 10/40
USPC .......................................... 398/58–64, 66–73
See application file for complete search history.

(56) References Cited

U.S. PATENT DOCUMENTS

| | | | | |
|---|---|---|---|---|
| 5,321,823 A | * | 6/1994 | Grundmann | G06F 9/462 712/224 |
| 8,244,139 B1 | * | 8/2012 | Morgan | H04Q 11/0067 398/153 |
| 8,275,268 B2 | * | 9/2012 | Kazutaka | H04B 10/077 398/11 |
| 8,644,707 B2 | * | 2/2014 | Gianordoli | H04B 10/29 398/66 |
| 8,724,997 B2 | * | 5/2014 | Zhang | H04Q 11/0067 398/70 |
| 9,112,613 B2 | * | 8/2015 | Kim | H04B 10/29 |
| 9,154,221 B2 | * | 10/2015 | Hu | H04Q 11/0067 |
| 9,203,545 B2 | * | 12/2015 | Zheng | H04Q 11/0067 |
| 2004/0029620 A1 | * | 2/2004 | Karaoguz | H04B 1/1615 455/574 |

(Continued)

*Primary Examiner* — Ken N Vanderpuye
*Assistant Examiner* — Dibson Sanchez
(74) *Attorney, Agent, or Firm* — Shun Yao; Park, Vaughan, Fleming & Dowler LLP

(57) ABSTRACT

One embodiment provides an apparatus for coupling between a trunk passive optical network (PON) and a leaf PON. The apparatus includes a trunk-side optical transceiver coupled to the trunk PON, a leaf-side optical transceiver coupled to the leaf PON, and an integrated circuit chip that includes an optical network unit (ONU) media access control (MAC) module, an optical line terminal (OLT) MAC module, and an on-chip memory.

24 Claims, 8 Drawing Sheets

(56) References Cited

U.S. PATENT DOCUMENTS

| | | | |
|---|---|---|---|
| 2006/0257149 A1* | 11/2006 | Hirth | H04J 14/02 398/72 |
| 2007/0133424 A1* | 6/2007 | Brolin | H04L 12/18 370/249 |
| 2008/0069564 A1* | 3/2008 | Bernard | H04Q 11/0067 398/72 |
| 2008/0247550 A1* | 10/2008 | Kozaki | H04L 9/12 380/278 |
| 2009/0060531 A1* | 3/2009 | Biegert | H04L 12/2856 398/214 |
| 2009/0175619 A1* | 7/2009 | Effenberger | H04B 10/07955 398/38 |
| 2009/0208210 A1* | 8/2009 | Trojer | H04J 3/1617 398/58 |
| 2010/0098412 A1* | 4/2010 | Boyd | H04J 14/0282 398/25 |
| 2010/0111532 A1* | 5/2010 | Chen | H04J 3/1694 398/67 |
| 2010/0178051 A1* | 7/2010 | Mizutani | H04J 3/0652 398/25 |
| 2010/0232794 A1* | 9/2010 | Zheng | H04J 3/1694 398/68 |
| 2010/0266293 A1* | 10/2010 | Sone | H04B 10/2914 398/175 |
| 2010/0272436 A1* | 10/2010 | Mizutani | H04B 10/272 398/25 |
| 2011/0038632 A1* | 2/2011 | Zou | H04B 10/27 398/72 |
| 2011/0076018 A1* | 3/2011 | Ghiggino | H04J 14/0226 398/58 |
| 2011/0085799 A1* | 4/2011 | Mizutani | H04Q 11/0067 398/37 |
| 2011/0116803 A1* | 5/2011 | Sone | H04Q 11/0067 398/98 |
| 2011/0129214 A1* | 6/2011 | Zheng | H04B 10/2504 398/27 |
| 2011/0135306 A1* | 6/2011 | Kim | H04J 3/0685 398/68 |
| 2011/0182588 A1* | 7/2011 | Wojtowicz | H04B 10/40 398/139 |
| 2011/0249968 A1* | 10/2011 | Ou | H04B 10/40 398/25 |
| 2012/0121265 A1* | 5/2012 | Suvakovic | H04B 10/272 398/66 |
| 2013/0028599 A1* | 1/2013 | Sone | H04J 14/0282 398/37 |
| 2014/0023366 A1* | 1/2014 | Zang | H04L 41/04 398/58 |
| 2014/0112656 A1* | 4/2014 | Yamashita | H04L 12/44 398/16 |
| 2014/0308038 A1* | 10/2014 | Zheng | H04Q 11/0067 398/68 |
| 2015/0326318 A1* | 11/2015 | Yamashita | H04Q 11/0067 398/58 |
| 2015/0373430 A1* | 12/2015 | Kim | H04Q 11/0067 398/48 |

* cited by examiner

METHOD AND SYSTEM FOR SCHEDULING CASCADED PON

RELATED APPLICATION

This application is a continuation of U.S. application Ser. No. 14/684,164, entitled "Method and System for Scheduling Cascaded PON," by inventor Edward W. Boyd, filed 10 Apr. 2015, which claims priority under 35 U.S.C. § 119 to U.S. Provisional Patent Application No. 61/978,137, entitled "Remote PON Solutions: Scheduling Method," by inventor Edward W. Boyd, filed on 10 Apr. 2014.

BACKGROUND

Field of the Invention

This disclosure is generally related to extended Ethernet passive optical networks. More specifically, this disclosure is related to a method and a system for scheduling in cascaded PONs.

Related Art

In order to keep pace with increasing Internet traffic, network operators have widely deployed optical fibers and optical transmission equipment, substantially increasing the capacity of backbone networks. A corresponding increase in access network capacity, however, has not matched this increase in backbone network capacity. Even with broadband solutions, such as digital subscriber line (DSL) and cable modem (CM), the limited bandwidth offered by current access networks still presents a severe bottleneck in delivering high bandwidth to end users.

Among different competing technologies, Ethernet passive optical networks (EPONs) are one of the best candidates for next-generation access networks. EPONs combine ubiquitous Ethernet technology with inexpensive passive optics, offering the simplicity and scalability of Ethernet with the cost-efficiency and high capacity of passive optics. With the high bandwidth of optical fibers, EPONs can accommodate broadband voice, data, and video traffic simultaneously. Such integrated service is difficult to provide with DSL or CM technology. Furthermore, EPONs are more suitable for Internet Protocol (IP) traffic, because Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. The "first mile" is generally a logical point-to-multipoint network, where a central office serves a number of subscribers. For example, an EPON can adopt a tree topology, wherein one trunk fiber couples the central office to a passive optical splitter/combiner. Through a number of branch fibers, the passive optical splitter/combiner divides and distributes downstream optical signals to subscribers and combines upstream optical signals from subscribers (see FIG. 1).

Transmissions within an EPON are performed between an optical line terminal (OLT) and optical network units (ONUs). The OLT generally resides in the central office and couples the optical access network to a metro backbone, which can be an external network belonging to, for example, an Internet service provider (ISP) or a local exchange carrier. An ONU can reside either at the curb or at an end-user location, and can provide broadband voice, data, and video services. ONUs are coupled to a one-by-n (1×n) passive optical coupler, where n is the number of ONUs, and the passive optical coupler is coupled to the OLT over an optical link. One may use a number of cascaded optical splitters/couplers to increase the number of ONUs. This configuration can significantly save on the number of fibers and amount of hardware.

Communications within an EPON include downstream traffic and upstream traffic. In the following description, "downstream" refers to the direction from an OLT to one or more ONUs, and "upstream" refers to the direction from an ONU to the OLT. In the downstream direction, because of the broadcast nature of the 1×N passive optical coupler, data packets are broadcast by the OLT to all ONUs and are selectively extracted by their destination ONUs. Moreover, each ONU is assigned one or more logical link identifiers (LLIDs), and a data packet transmitted by the OLT typically specifies the LLID of the destination ONU. In the upstream direction, the ONUs need to share channel capacity and resources, because there is only one link coupling the passive optical coupler to the OLT.

Due to the limitations on optical power budget and fiber availability, in many cases, extended PONs with longer reaches and higher densities are needed.

SUMMARY

One embodiment provides an apparatus for coupling between a trunk passive optical network (PON) and a leaf PON. The apparatus includes a trunk-side optical transceiver coupled to the trunk PON, a leaf-side optical transceiver coupled to the leaf PON, and an integrated circuit chip that includes an optical network unit (ONU) media access control (MAC) module, an optical line terminal (OLT) MAC module, and an on-chip memory.

In a variation on this embodiment, the trunk-side optical transceiver includes one of: a small form-factor pluggable (SFP) transceiver, an enhanced small form-factor pluggable (SFP+) transceiver, and a 10 Gigabit small form-factor pluggable (XFP) transceiver.

In a variation on this embodiment, the integrated circuit chip and the leaf-side optical transceiver is packaged together to form an integrated module. The integrated module has a standard form factor that is in compliance with one of: a small form-factor pluggable (SFP) specification, an enhanced small form-factor pluggable (SFP+) specification, and a 10 Gigabit small form-factor pluggable (XFP) specification.

In a variation on this embodiment, the trunk PON and the leaf PON are running at different data rates.

In a variation on this embodiment, the ONU MAC module is configured to: receive, from the trunk PON, a bandwidth-assigning frame dedicated to a single logical link in the leaf PON, with the band-width assigning frame including parameters relative to the trunk PON; and send the bandwidth-assigning frame to the OLT MAC module. The OLT MAC module is configured to: receive the bandwidth-assigning frame from the ONU MAC module, generate a new bandwidth-assigning frame by replacing the parameters relative to the trunk PON with parameters relative to the leaf PON, and send the new bandwidth-assigning frame to the single logical link.

In a further variation, the OLT MAC module is further configured to: receive a bandwidth-requesting frame comprising parameters relative to the leaf PON, and convert the bandwidth-requesting frame to a new bandwidth-requesting frame comprising parameters relative to the trunk PON.

In a further variation, the OLT MAC module is further configured to: receive a data burst in response to the new bandwidth-assigning frame, and store the received data burst in an upstream data queue. The ONU MAC module is configured to send the data burst stored in the upstream data queue upstream to the trunk PON in response to determining that a bandwidth assignment included in the bandwidth-assigning frame being valid based on the parameters relative to the trunk PON.

In a variation on this embodiment, the ONU MAC module is configured to: receive, from the trunk PON, a bandwidth-assigning frame assigning bandwidth to multiple logical links in the leaf PON; extract a bandwidth assignment from the received bandwidth-assigning frame; and send the extracted bandwidth assignment to the OLT MAC module. The OLT MAC module is configured to: receive the extracted bandwidth assignment, divide the received bandwidth assignment into multiple new bandwidth assignments, generate multiple new bandwidth-assigning frames using the multiple new bandwidth assignments; and send the multiple new bandwidth-assigning frames to the multiple logical links.

In a variation on this embodiment, the OLT MAC module is configured to: receive, from multiple logical links in the leaf PON, bandwidth-requesting frames; generate multiple bandwidth assignments corresponding to the bandwidth-requesting frames; and store the multiple bandwidth assignments into a bandwidth-assigning queue. The ONU MAC module is configured to: access the bandwidth-assigning queue, generate a single bandwidth-requesting frame based on the multiple bandwidth-assignments, and send the single bandwidth-requesting frame to the trunk PON.

In a further variation, the ONU MAC module is further configured to: receive a single bandwidth-assigning frame in response to the bandwidth-requesting frame, extract a bandwidth assignment from the bandwidth-assigning frame, and generate multiple bandwidth-assigning frames based on the extracted bandwidth assignment and information included in the bandwidth-assigning queue.

In a further variation, the OLT MAC module is configured to: receive data bursts from the multiple logical links, store the received data bursts into a single upstream queue, monitor status of the single upstream queue, and suspend generation of new bandwidth assignments in response to the single upstream queue being full.

In a further variation, the ONU MAC module is further configured to remove the multiple bandwidth-assignments from the bandwidth-assigning queue after sending the single bandwidth-requesting frame to the trunk PON, thereby allowing new bandwidth assignments to be generated and stored in the bandwidth-assigning queue.

One embodiment provides a system for scheduling upstream transmission in a cascaded passive optical network (PON) comprising a trunk PON and one or more leaf PONs. During operation, the system receives, by a bridge device coupling between the trunk PON and a leaf PON, a plurality of bandwidth-requesting frames from a plurality of logical links within the leaf PON, generates a plurality of bandwidth assignments based on the received bandwidth-requesting frames, and stores the bandwidth assignments in a bandwidth-assigning queue. The system further assembles a single bandwidth-requesting frame based on the bandwidth assignments and sends the single bandwidth-requesting frame upstream to an optical line terminal (OLT) in the trunk PON. The system receives, from the OLT in the trunk PON, a single bandwidth-assigning frame in response to the single bandwidth-requesting frame, generate a plurality of new bandwidth-assigning frames based on the received single bandwidth-assigning frame and the bandwidth assignments stored in the bandwidth-assigning queue, and sends the new bandwidth-assigning frames downstream to the logical links within the leaf PON.

BRIEF DESCRIPTION OF THE FIGURES

In the figures, like reference numerals refer to the same figure elements.

DETAILED DESCRIPTION

Overview

Embodiments of the present invention provide a compact, low-power bridge device that enables cascading of two PON stages. The bridge device includes one or more ONU modules on the trunk side and one or more OLT modules on the leaf side. Each ONU module can include a conventional ONU transceiver having a standard form factor. The OLT module can include an OLT transceiver integrated with a single ONU-OLT combination application-specific integrated circuit (ASIC) chip. The OLT module can also have a standard form factor, thereby ensuring that the bridge device is compact and low power. To limit the amount of jitter and delay, in some embodiments, the scheduling of the two PON stages is performed within a single scheduling domain. Specifically, one scheduling solution is to have the scheduler in the trunk PON to schedule for individual LLIDs in the leaf PONs. Another solution is to aggregate multiple LLIDs (can be LLIDs belonging to a class of service or LLIDs within a single ONU) in the leaf PON into a single trunk side LLID, and have the scheduler to schedule transmission for the trunk side LLID using a single GATE. The bridge scheduler receives such a GATE, and schedules for multiple LLIDs in the leaf PON by generating and sending out multiple GATEs to the LLIDs. Both scheduling solutions require only a single upstream data queue, thereby eliminating the need for an external memory.

Bridge Device for Cascaded PON

Figure 1:
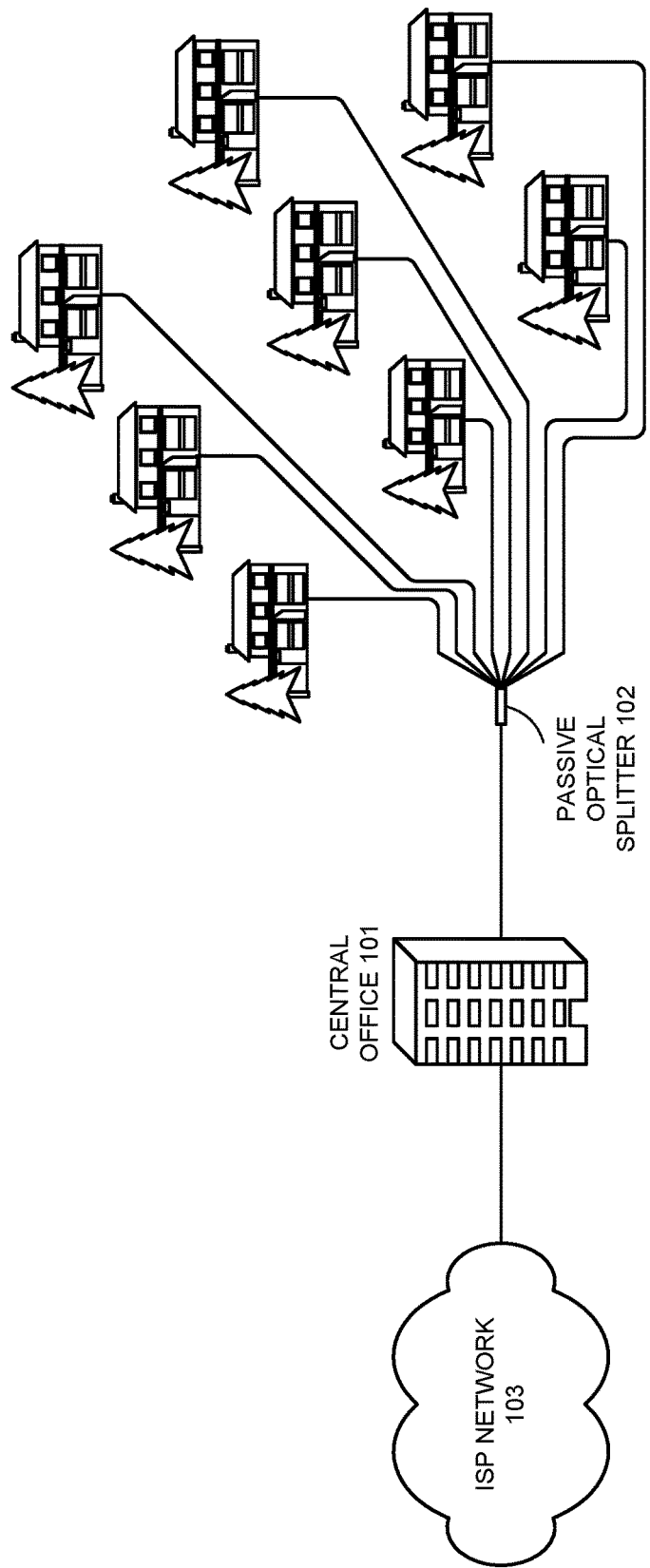
FIG. 1 illustrates an EPON, wherein a central office and a number of subscribers are coupled through optical fibers and a passive optical splitter (prior art).

FIG. 1 illustrates an EPON including a central office and a number of subscribers coupled through optical fibers and a passive optical splitter (prior art). A passive optical splitter 102 and optical fibers couple the subscribers to a central office 101. Passive optical splitter 102 can reside near end-user locations to minimize the initial fiber deployment costs. Central office 101 can couple to an external network 103, such as a metropolitan area network operated by an Internet service provider (ISP). Although FIG. 1 illustrates a tree topology, a PON can also be based on other topologies, such as a logical ring or a logical bus.

If passive optical splitter 102 has a 1:32 power split ratio, the optical power budget and the passive nature of the PON limits the distance between central office 101 and the ONUs to no more than 20 km. However, many networks require a greater distance (which can be up to 150 km in a cable network) between the operator facility and the subscribers. In addition, in many cases, the number of trunk fibers that connect the subscribers to the operator network is limited, thus limiting the total number of subscribers supported by the network. Therefore, it is desirable to provide a solution that can extend the reach of the PON and increase the PON density.

One solution for extended PON is to employ a bridge device that enables either the cascading of two PON stages or point-to-point Ethernet backhauling of multiple remote PONs.

Figure 2A:
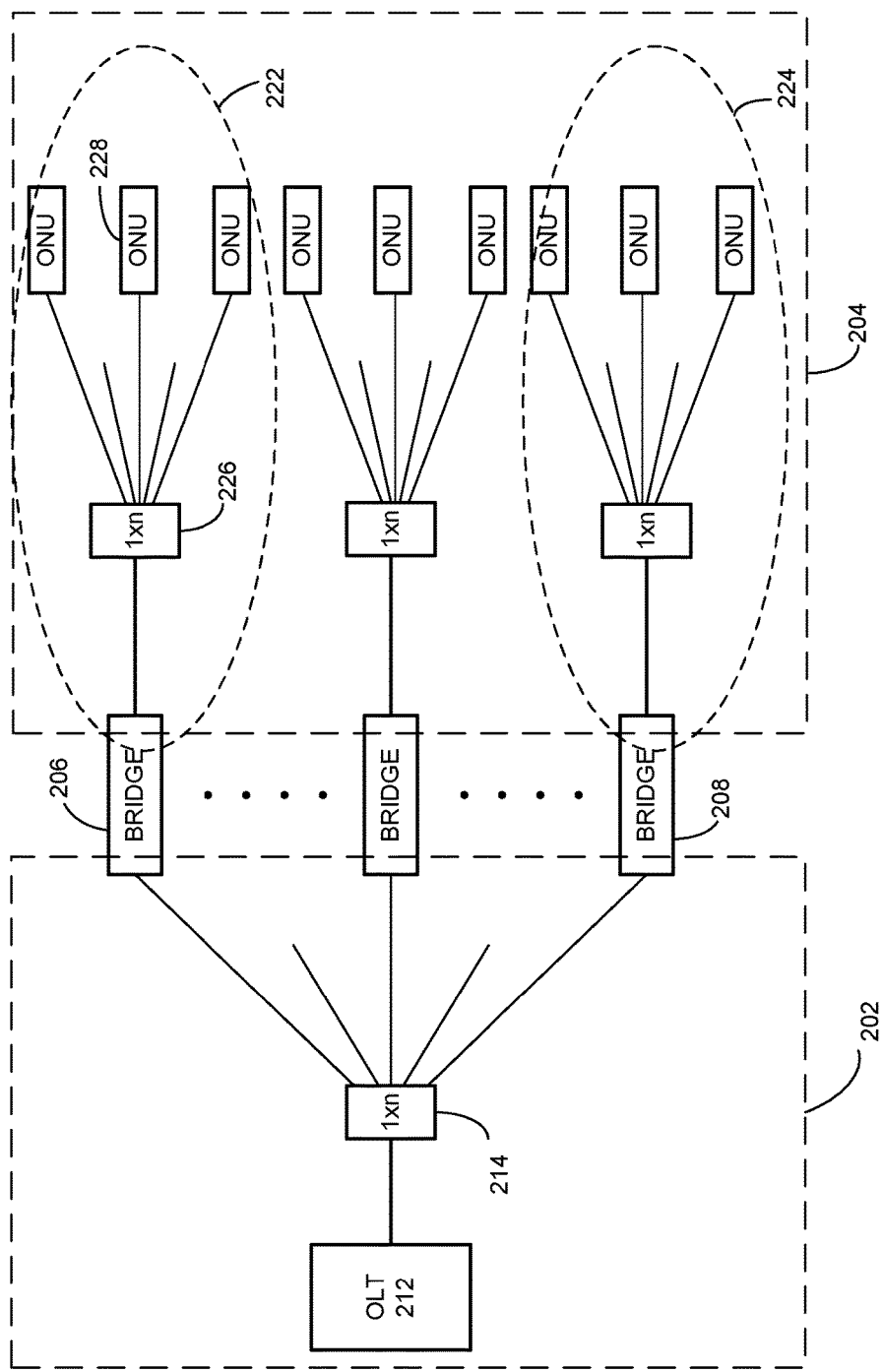
FIG. 2A presents a diagram illustrating the exemplary architecture of a two-stage PON.

FIG. 2A presents a diagram illustrating the exemplary architecture of a two-stage PON. In FIG. 2A, a network 200 includes a first PON stage 202 and a second PON stage 204 coupled to each other via a number of bridges, such as bridges 206 and 208. First PON stage 202 itself is a PON that includes an OLT 212 and a 1×n passive optical splitter 214, with outputs of passive optical splitter 214 coupled to the bridges. OLT 212 is usually located at the operator facility, such as the central office. Second PON stage 204 includes multiple PONs, such as a PON 222 and a PON 224. For cascaded PONs based on the tree topology, as shown in FIG. 2A, the PON in the first (upstream) PON stage 202 is also called a "trunk" PON, and the PONs in the second (downstream) PON stage 204 are called "leaf" PONs. Each leaf PON includes an OLT embedded in the bridge, a passive optical splitter, and a number of ONUs coupled to the passive optical splitter. For example, in FIG. 2A, leaf PON 222 includes an OLT (not shown) embedded in bridge 206, a 1×n passive optical splitter 226, and a number of ONUs, such as ONU 228.

As one can see from FIG. 2A, by cascading two PON stages, the system can first extend the reach of the PON (from 20 km to 40 km), and second it can support many more ONUs, and hence customers, than a single-stage PON. For example, if the passive optical splitters have a split ratio of 1:32, network 200 can support up to 32×32=1024 customers. Note that the split ratio can be increased if a shorter distance is needed. In addition, because current PON standard (IEEE 802.3) defines solutions for both 1 Gigabit per second EPON (1 G-EPON) and 10 Gigabit per second EPON (10 G-EPON), it is possible to have a network that supports both 1 G-EPON and 10 G-EPON. In the example shown in FIG. 2A, it is possible to have the trunk PON running at a 10 G data rate and the leaf PONs running at 1 G data rate. This way, a large number of low-cost 1 G-EPON ONUs can be aggregated without a bandwidth bottleneck in the trunk.

Figure 2B:
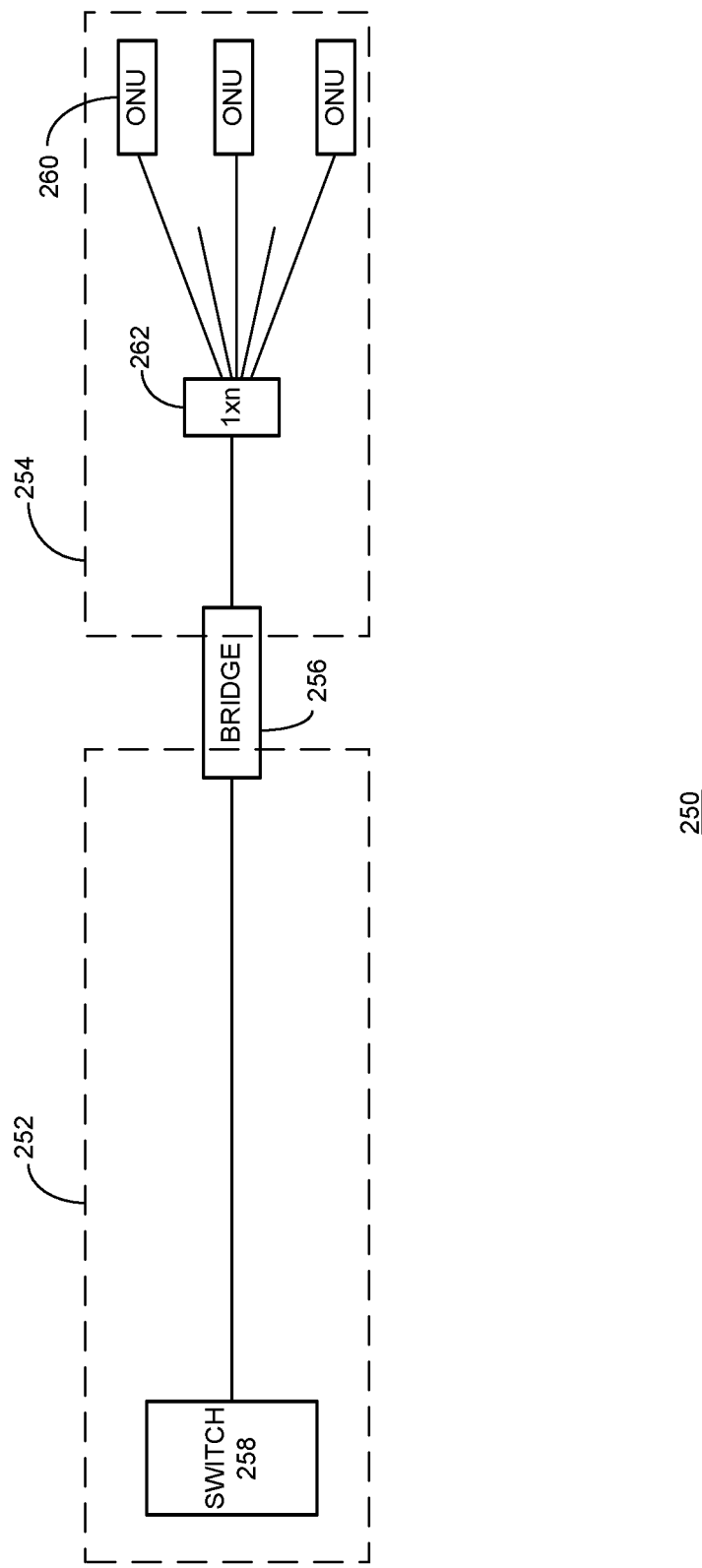
FIG. 2B presents a diagram illustrating an exemplary long-reach PON.

FIG. 2B presents a diagram illustrating an exemplary long-reach PON. In FIG. 2B, a network 250 includes a point-to-point link 252, a PON 254, and a bridge 256. Point-to-point link 252 couples a switch 258 (which can be an Ethernet switch) located in a central office to the upstream (trunk) port of bridge 256. PON 254 includes a number of ONUs (such as ONU 260) coupled to the downstream (leaf) port of bridge 256 via a 1×n splitter 262. The distance between switch 258 and bridge 256 can be greater than 100 km, thus significantly enhancing the reach of the PON. To further increase the number of ONUs supported by network 250, point-to-point link 252 can be a CWDM (Coarse Wavelength Domain Multiplex) or a DWDM (Dense Wavelength Domain Multiplex) link with multiple wavelength channels. Each wavelength channel corresponds to a leaf PON.

Note that one important component for realizing the cascaded PON is the bridge. In practice, the bridges are remote, outdoor devices that can be pole-, wall-, or strand-mounted. Because the bridges are outside of the operator facility, it is desirable to have low-power bridges that are compact in size, which can be challenging considering the complex function of the bridges, such as needing to support EPONs of different speeds.

Figure 3:
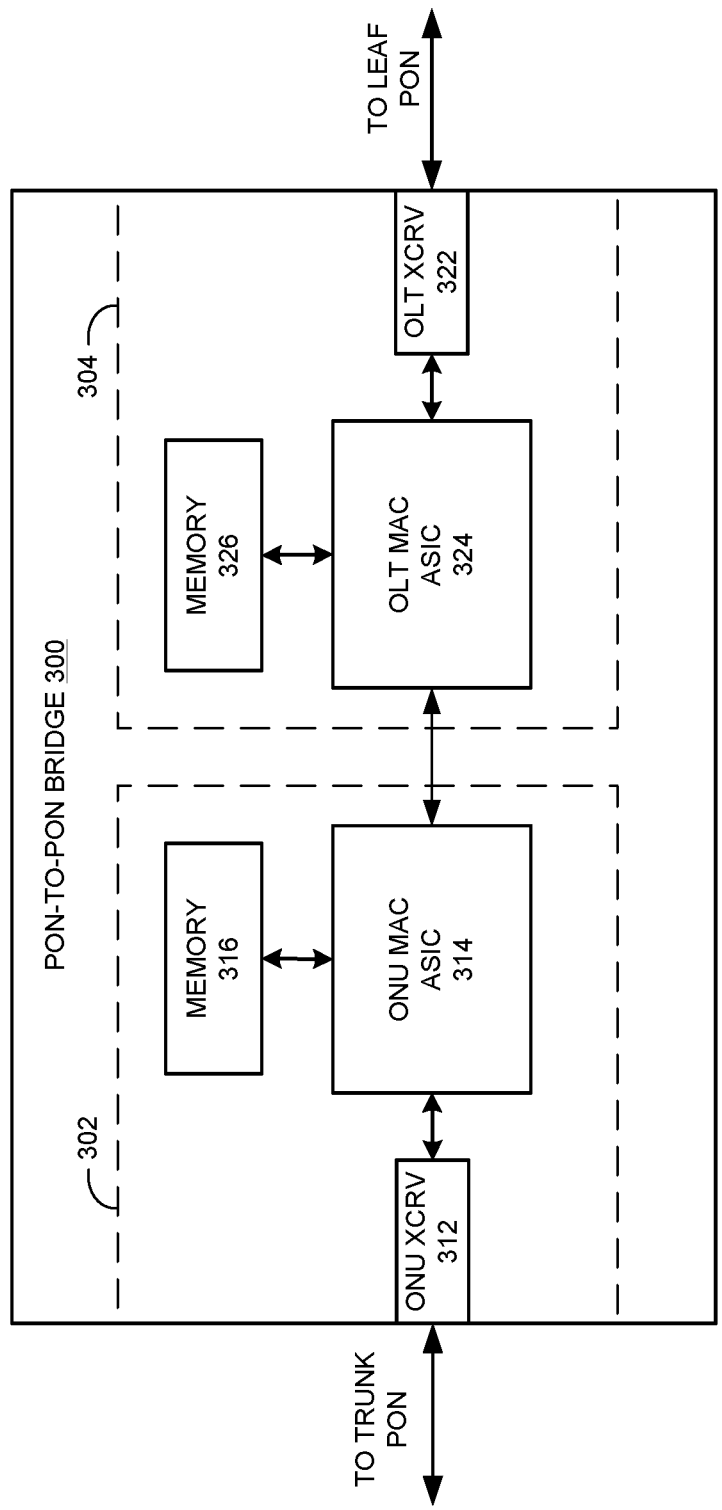
FIG. 3 presents a diagram illustrating a conventional solution for a PON-to-PON bridge (prior art).

FIG. 3 presents a diagram illustrating a conventional solution for a PON-to-PON bridge (prior art). In FIG. 3, a bridge 300 includes an ONU module 302 coupled to the trunk PON, and an OLT module 304 coupled to the leaf PON. More specifically, ONU module 302 can include an ONU transceiver 312 (which can be a standard optical transceiver), an ONU MAC (media-access control) ASIC chip 314, and an external memory 316 (which can be a dynamic random access memory (DRAM)). Similarly, OLT module 304 can include an OLT transceiver 322 (which can be a standard optical transceiver), an OLT MAC ASIC chip 324, and an external memory 326 (which can be a DRAM). Note that ONU MAC ASIC chip 314 handles ONU logics, such as receiving GATE frames from the upstream OLT and sending REPORT frames to the upstream OLT; and OLT MAC ASIC chip 324 handles OLT logics, such as scheduling.

From FIG. 3, one can see that the conventional PON-to-PON bridge cannot meet the size and power requirement of a remote device outside of a central office. The separated ONU and OLT ASICs and the large memories that are required for buffering upstream traffic from the leaf PONs occupy too much space and consume too much power.

Figure 4A:
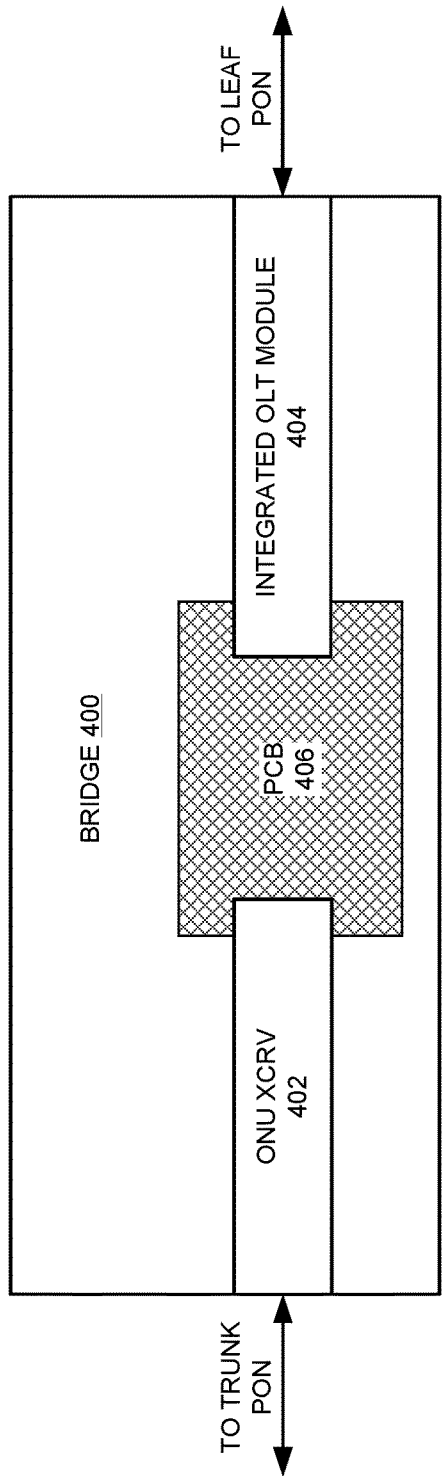
FIG. 4A presents a diagram illustrating an exemplary bridge for cascading two PON stages, in accordance with an embodiment of the present invention.

Embodiments of the present invention provide a compact, low-cost bridge solution for the cascaded PON. FIG. 4A presents a diagram illustrating an exemplary bridge for cascading two PON stages, in accordance with an embodiment of the present invention. In FIG. 4A, bridge 400 includes a standard ONU optical transceiver 402, an integrated OLT module 404, and a printed circuit board (PCB) 406 coupling together ONU transceiver 402 and integrated OLT module 404. Note that both ONU transceiver 402 and integrated OLT module 404 can be hot-pluggable modules having standard dimensions and interface, including but not limited to: XENPAK, 10 Gigabit small form-factor pluggable (XFP), small form-factor pluggable (SFP), enhanced small form-factor pluggable (SFP+), etc. The plug-in sockets for ONU transceiver 402 and integrated OLT module 404 are mounted on PCB 406.

Figure 4B:
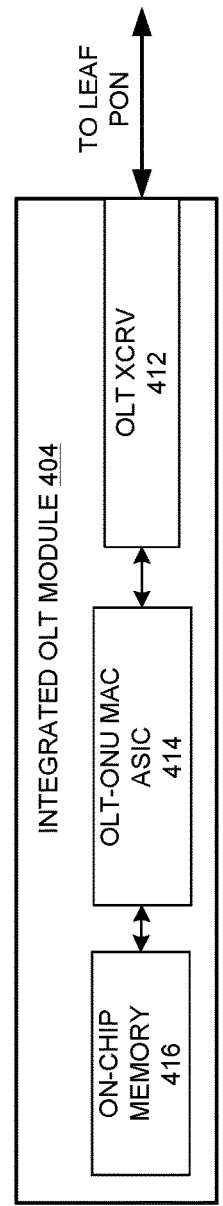
FIG. 4B presents a diagram illustrating an exemplary integrated OLT module, in accordance with an embodiment of the present invention.

FIG. 4B presents a diagram illustrating an exemplary integrated OLT module, in accordance with an embodiment of the present invention. In FIG. 4B, integrated OLT module 404 includes an OLT optical transceiver 412, an ASIC chip 414, and an on-chip memory 416. OLT optical transceiver 412 can be a standard optical transceiver. ASIC chip 414 combines the OLT MAC and the ONU MAC into a single integrated chip. On-chip memory 416 can serve as a small data buffer. Detailed descriptions of the data buffer will come later in this disclosure. Note that, because integrated OLT module 404 includes both the OLT and the ONU MAC, it can directly drive an ONU optics module (i.e., transceiver 402). More specifically, the laser enable signal for the ONU optics module can be connected to the signal detect (or other signal) output on the socket of integrated OLT module 404. Therefore, the trunk ONU will be enabled when the leaf OLT has signals. The OLT MAC in integrated OLT module 404 controls the connected leaf PON.

By comparing the proposed bridge architecture (shown in FIGS. 4A and 4B) to the conventional solution shown in FIG. 3, one can see that the proposed bridge architecture provides a highly integrated, low-power solution. More specifically, the proposed bridge that cascades two stages of PONs no longer needs external memories, thus significantly reducing device size and power consumption. The integrated OLT module also provides a modular solution, which can scale up when the network grows, especially when the trunk is a point-to-point Ethernet link. In other words, when the system needs to support more ONUs, it can increase the number of wavelength channels in the point-to-point link and plug in additional integrated OLT modules in the bridge (supposing empty slots are available).

Scheduling Cascaded PON

The cascaded PON network with two PON stages, such as cascaded network 200 shown in FIG. 2, presents a unique challenge to PON scheduling. One natural scheduling solution is to have each PON stage schedule its own traffic. For example, a scheduler within OLT 212 can schedule traffic in first PON stage 202, and a scheduler within each leaf PON can independently schedule traffic in the corresponding leaf PON. In other words, the network includes two scheduling domains, one for each PON stage. However, such a solution can lead to increased delay and jitter. More specifically, because the two PON stages are scheduled independently, the polling time from each network will be added together, thus increasing the total delay and jitter. To solve this problem, in embodiments of the present invention, a cascaded PON network supports a single scheduling domain that covers both PON stages.

In some embodiments, the scheduling within the single scheduling domain is performed by the trunk OLT, and the bridge is transparent. More specifically, the trunk OLT knows the LLIDs of all ONUs in the leaf PONs. During operation, the trunk OLT scheduler issues a GATE frame to an ONU in a leaf PON with respect to the trunk PON. Such a GATE frame is generated far enough in advance to support delays in both PONs. On the other hand, the scheduler in the leaf OLT (located in the bridge) is disabled. At the bridge, the GATE frame from the trunk OLT (also called the trunk GATE) is decomposed to extract the grant information. The grant specified in the trunk GATE is called a trunk grant. The extracted grant information can be used to create a new GATE frame (also called a leaf GATE). The new GATE frame specifies a grant issued on the leaf network (called the leaf grant) as if it came from the disabled leaf PON scheduler. The timestamp, the start time, and the length parameters within the new GATE frame are now relative to the leaf PON. In other words, these timing related parameters are defined based on a master clock running on the OLT of the leaf PON.

The leaf ONU receives the leaf grant and sends its data burst upstream accordingly. The bridge receives the leaf ONU data and buffers the data in the on-chip memory of the integrated OLT module. The leaf ONU data remains in the bridge buffer until the trunk side grant is valid, as defined by the start time specified in the trunk GATE. Once the trunk side grant is valid, the leaf ONU data burst is transmitted upstream as if the data burst were directly sent by the leaf ONU. Note that, because the GATEs are directly issued to the leaf PON (or specific LLIDs (logical link identifiers) on the leaf PON) in the order required for transmission on the trunk network, only a single queue is required in the upstream direction between the leaf PON and the trunk PON. It is not necessary to have a queue for each LLID. Such a single upstream queue for all LLIDs preserves the order of the downstream GATEs (upstream data with an earlier grant is queued first), and limits the die size of the bridge chip. Considering the large number of LLIDs (which can be hundreds) in the network, if each LLID is individually queued in the bridge, external memory would be needed. On the other hand, with the transparent bridge scheme, data sent upstream through the bridge has a fixed time from reception to transmission with a small amount of buffer needed. The bridge doesn't need to buffer packets, generate REPORT frames, and wait for a grant over an unknown period of time which would require significantly more buffer and an external memory.

On the other hand, REPORT frames generated by leaf ONUs, also called the leaf REPORT, are sent to the trunk OLT through the bridge. The bridge itself does not generate REPORTs based on its queue status; instead, the bridge converts data in the leaf REPORT from the leaf PON parameters to the trunk PON parameters, which can be used by the trunk OLT to issue grants to the leaf ONUs.

The scheduling scheme with the transparent bridge additionally requires special attentions in the areas of bandwidth management and loop time control. Because the upstream traffic is often oversubscribed, upstream bandwidth management is a necessity. The management of the bandwidth can be handled by the scheduler in the trunk OLT. In some embodiments, this trunk side scheduler provides a group shaping function for the upstream traffic from the leaf PONs. For example, the group shaping function may specify that all of the LLIDs on a 1 G-EPON leaf network should have a short-term rate limit of 1 Gbps. Note that the rate limit should be averaged over a known period of time. The size of the upstream data queue in the bridge should be large enough to hold traffic over the time period used for averaging the rate limit, thus ensuring the upstream rate is no greater than 1 Gbps. In terms of the loop time, the trunk OLT provides a long loop delay from the time the grant is issued in a GATE to the time an upstream burst is expected. The delay should be long enough to cover the maximum round trip time of both the trunk PON and the leaf PON with the longest delay. In addition, the delay should include additional time that the bridge needs in order to process the trunk GATE and generate the leaf GATE. The loop time also needs to include the time period used for averaging the rate limit in the leaf network.

Figure 5:
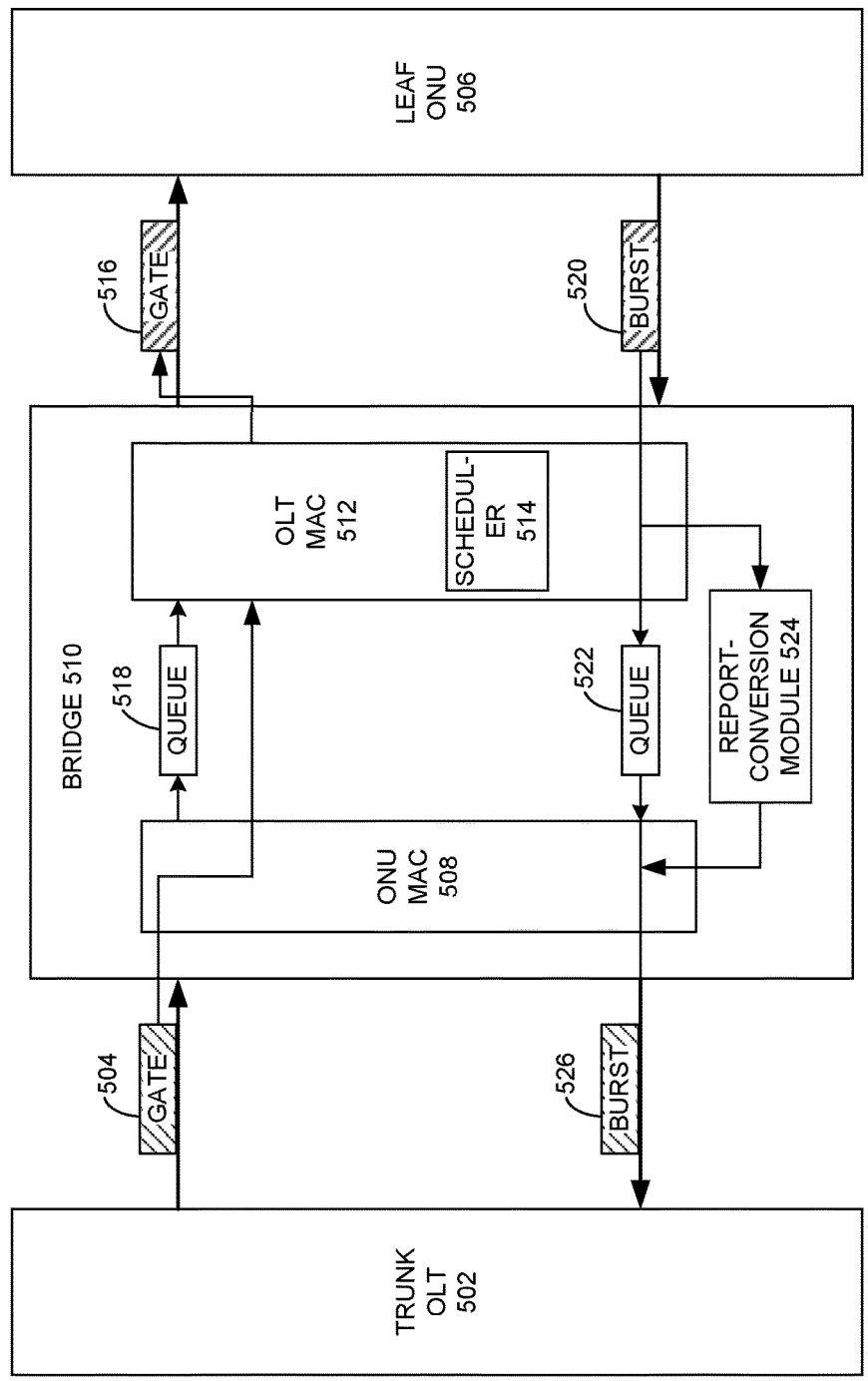
FIG. 5 presents a diagram illustrating the flow of data and MAC control frames in a network with cascaded PONs, in accordance with an embodiment of the present invention.

FIG. 5 presents a diagram illustrating the flow of data and MAC control frames in a network with cascaded PONs, in accordance with an embodiment of the present invention. In the downstream direction, trunk OLT 502 generates a GATE frame 504 that includes a grant to a leaf ONU 506. Considering leaf ONU 506 may support multiple logical links, the grant may be issued to a particular logical link identifier (LLID). Note that parameters in GATE frame 504, such as the timestamp, the start time, and the length are with respect to the trunk PON. GATE frame 504 arrives at an ONU MAC 508 located on bridge 510. ONU MAC 508 decomposes GATE frame 504 to obtain grant information, such as the length of the grant, and sends the grant information to an OLT MAC 512 also located on bridge 510. Note that scheduler 514 within OLT MAC 512 is disabled. Using the grant information included in GATE frame 504, OLT MAC 512 generates a new GATE frame 516 with its own parameters relative to the leaf PON. In other words, instead of scheduling for the leaf PON, OLT MAC 512 merely translates grants provided by the trunk OLT to grants that are relative to the leaf PON. The downstream data from trunk OLT 502 can be buffered in a data queue 518 before OLT MAC 512 releases the data to leaf ONUs, such as leaf ONU 506. Note that, when scheduling, trunk OLT 502 needs to have a longer loop delay to allow the GATE and REPORT frames to cross both the trunk and leaf networks.

In the upstream direction, upon receiving new GATE frame 516, leaf ONU 506 transmits a data burst 520 upstream according to the grant included in new GATE frame 516. OLT MAC 512 places data burst 520 into a data queue 522. In the meantime, the REPORT frame carried along with data burst 520 is separately processed by a REPORT-conversion module 524, which converts parameters (such as the timestamp and the queue status) included in the REPORT frame from leaf network parameters to trunk network parameters. Note that REPORT-conversion module 524 can be a standalone module, part of OLT MAC 512, or part of ONU MAC 508. Data burst 520 remains in data queue 522 until the grant (as specified by the start time in GATE frame 504) is valid, after which ONU MAC 508 transmits data burst 526 (which includes user data in data queue 522 and the converted REPORT frame) upstream to trunk OLT 502.

This transparent bridge scheduling scheme provides significant performance improvements. Note that, if the trunk network and the leaf network are scheduled independently, the polling times from the leaf and trunk networks are added together to determine the upstream jitter; however, in the case of the transparent bridge where the trunk OLT directly schedules the leaf ONUs, the upstream jitter resulting from polling is halved, because the leaf network has a fixed delay after the initial polling. This improvement is key to meeting the delay and jitter specifications for Metro Ethernet Forum (MEF) business services. In addition, the transparent bridge also allows for a fair distribution of bandwidth across many ONUs. More specifically, the visibility of the individual customers across the large network allows for a per-user distribution of the excess bandwidth. Moreover, as discussed previously, this scheduling scheme allows a single limited-size upstream queue between the trunk PON and the leaf PON, thus significantly reducing the size and power consumption of the bridge device. Note that, in the transparent bridge architecture, upstream frames are never dropped in the upstream queue because they are all guaranteed a time slot in the trunk network.

Although the aforementioned scheduling scheme offers many advantages, lack of scalability is a notable drawback. In the transparent bridge scheduling scheme, the trunk OLT needs to know all LLIDs in all leaf PONs, which can be challenging because the number of LLIDs in the network can be very large. Note that, in many cases, each ONU may support multiple (can be up to 8) LLIDs, and the PON OLT is required to issue GATE to each LLID. To mitigate the complexity of tracking all LLIDs, in some embodiments, the scheduling for the cascaded PON is performed within a single scheduling domain with LLID aggregation. In this scheme, instead of issuing grants to individual leaf LLIDs, the trunk OLT issues grants to trunk LLIDs, with each trunk LLID representing multiple leaf LLIDs.

In some embodiments, leaf LLIDs can be grouped according to class of service, and LLIDs of the same class of service (such as the best effort data) will be represented by a single LLID on the trunk PON. During operation, the scheduler on the trunk OLT issues a GATE frame to a class of service on the bridge, which is represented by a trunk LLID. For example, the GATE may grant 100 KB (kilobytes) for the best effort data. The GATE frame arrives at the bridge ONU, which decomposes the GATE to extract the grant information (i.e, the start time and length of the grant). Note that, here, the grant is not issued to a single leaf LLID but multiple LLIDs within a class of service. The multiple LLIDs may be located on multiple ONUs. Using the extracted grant information (which specifies the start time and length of the grant), the bridge scheduler (within the bridge OLT) schedules upstream transmission in the leaf PON and generates multiple new GATE frames to be sent to the multiple LLIDs. The grant in each new GATE frame may occupy a segment of the large grant assigned by the trunk OLT. In other words, for each GATE frame received from the trunk OLT, the bridge sends out multiple GATE frames to leaf ONUs. In the upstream direction, the bridge polls many LLIDs and gathers their queue status to create an aggregated REPORT frame (also called a trunk REPORT) for the trunk PON. In some embodiments, the queue values may be added to obtain the aggregated REPORT.

Figure 6:
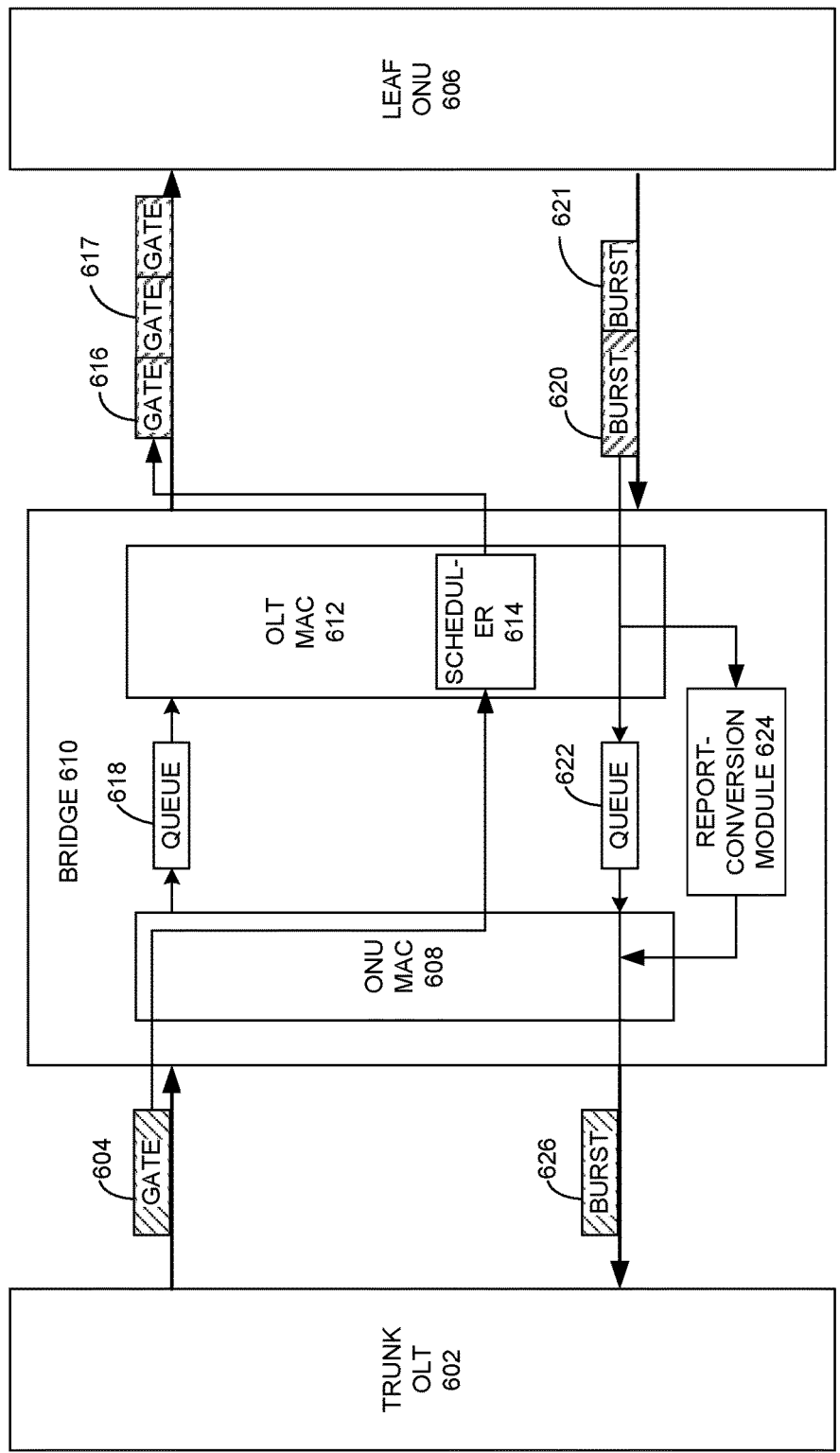
FIG. 6 presents a diagram illustrating the flow of data and MAC control frames in a network with cascaded PONs, in accordance with an embodiment of the present invention.

FIG. 6 presents a diagram illustrating the flow of data and MAC control frames in a network with cascaded PONs, in accordance with an embodiment of the present invention. As one can see, the flow of control frames shown in FIG. 6 is very similar to that shown in FIG. 5, except that, in FIG. 6, bridge scheduler 614 is enabled, and multiple leaf GATEs are sent downstream in response to a single trunk GATE.

More specifically, during operation, trunk OLT 602 generates a GATE frame 604 that includes a large grant for upstream transmission of a certain class of service. In some embodiments, multiple leaf LLIDs may belong to the same class of service. Note that parameters in GATE frame 604, such as the timestamp, the start time, and the length of the grant are with respect to the trunk PON. GATE frame 604 arrives at an ONU MAC 608 located on bridge 610. ONU MAC 608 decomposes GATE frame 604 to obtain information (such as the length and the start time) of the large grant, and sends such information to scheduler 614 within OLT MAC 612. Using such information, scheduler 614 schedules for the leaf PON, which involves issuing new GATEs, such as GATEs 616 and 617, to the multiple LLIDs of that particular class of service. The total length of all the grants within the new GATEs should be equal to or less than the length of the large grant issued by trunk OLT 602. When generating the new GATEs, scheduler 614 uses parameters that are relative to the leaf PON. The downstream data from trunk OLT 602 can be buffered in data queue 618 before OLT MAC 612 releases the data to leaf ONUs, such as leaf ONU 606.

In the upstream direction, leaf ONUs, such as leaf ONU 606, transmit data bursts, such as data bursts 620 and 621, in response to receiving the new GATE frames. OLT MAC 612 places those data bursts into a data queue 622. In the meantime, the REPORT frames carried along with those data bursts are separately processed by a REPORT-conversion module 624, which adds up queue values in the multiple reports to create a single REPORT frame. Note that REPORT-conversion module 524 can be a standalone module, part of OLT MAC 612, or part of ONU MAC 608. Similarly, data bursts 620 and 621 are combined into a single burst 626, which is transmitted upstream to trunk OLT 602 when the large grant in GATE frame 604 becomes valid (as specified by the start time of the grant).

In addition to the scheduling scheme using an aggregated GATE as shown in FIG. 6, the bridge may also perform scheduling using information included in the aggregated REPORT. In this case, the bridge scheduler uses the REPORT information from the leaf network (from multiple leaf REPORTs) to fill a queue of grants for a REPORT frame on the trunk network. The grants needed are then carried in a trunk REPORT frame to the trunk scheduler. Once granted by the trunk scheduler (a trunk GATE is received containing a large grant), the grants in the REPORT queue are transferred for generation of GATEs on the leaf network. More specifically, the LLIDs of the grants in the REPORT queue are associated with segments of the length of the large grant. The data bursts from the leaf network arrive in time for the trunk network. This method of granting into upstream REPORT frames allows for the bridge scheduler to schedule the upstream of the leaf network. In this case, it is likely that a REPORT frame is generated for all of the classes of service so they can be handled as separate LLIDs.

Figure 7:
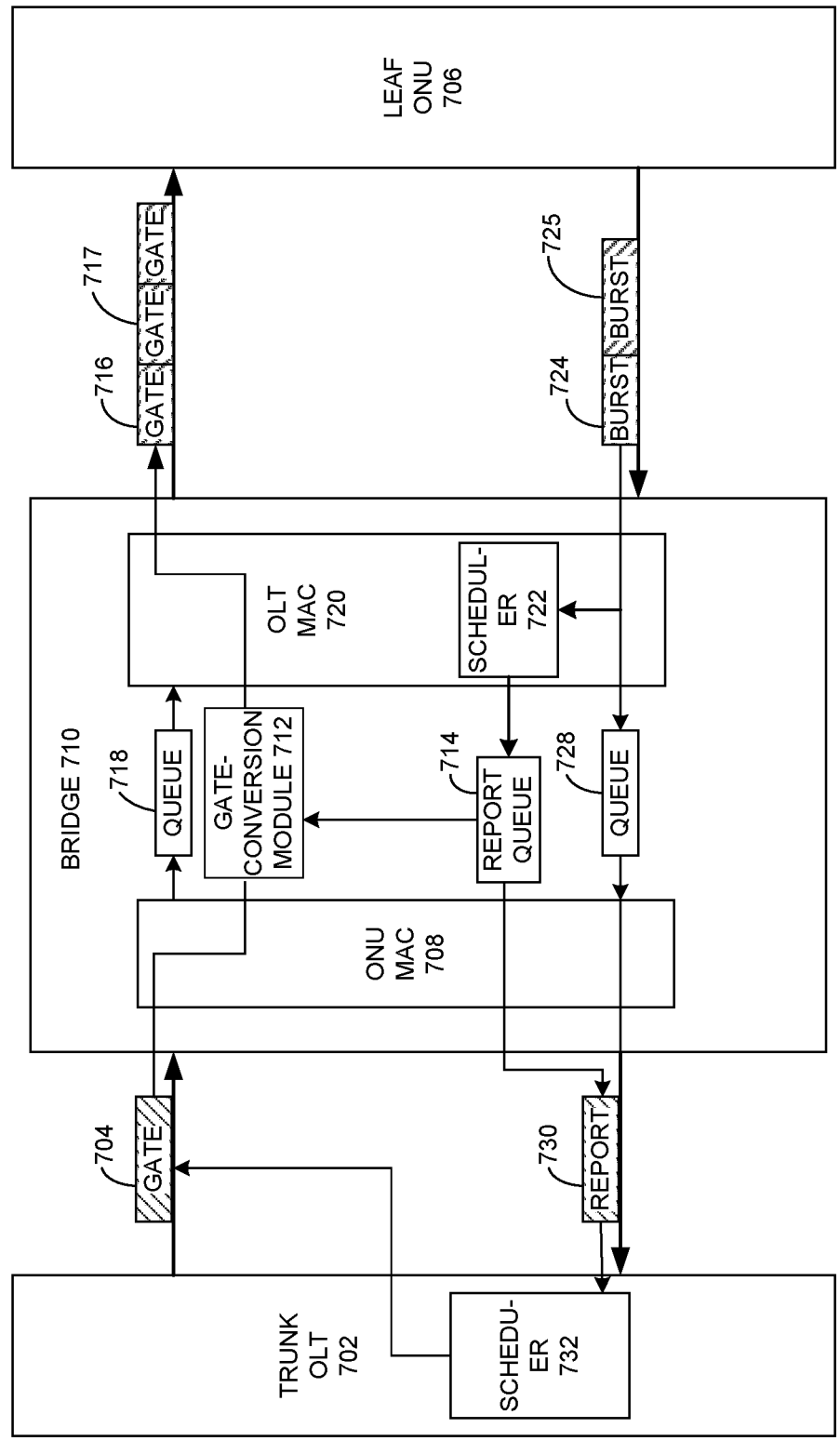
FIG. 7 presents a diagram illustrating the flow of data and MAC control frames in a network with cascaded PONs, in accordance with an embodiment of the present invention.

FIG. 7 presents a diagram illustrating the flow of data and MAC control frames in a network with cascaded PONs, in accordance with an embodiment of the present invention. In the example, shown in FIG. 7, the flow of control frames starts with bridge scheduler 722 (which is located within OLT MAC 720) polling downstream leaf ONUs, such as leaf ONU 706. Based on the service level agreement (SLA) and REPORT values (which can be carried with upstream bursts 724 and 725) from the LLIDs on the leaf PON, scheduler 722 issues grants to the leaf LLIDs, and places the leaf grants in REPORT queue 714. Note that this is different from the regular PON where the grants are directly issued to downstream ONUs as GATEs. On the other hand, data bursts from leaf ONUs, such as data bursts 724 and 725, will be queued into an upstream data queue 728, and combined into a single trunk side burst to be sent from bridge 710 to trunk OLT 702. Individual REPORT frames carried in the data bursts are extracted by scheduler 722, which uses the REPORT information (ONU queue status) to issue grants for the ONUs. As discussed previously, the issued grants are placed into REPORT queue 714. Moreover, the individual REPORTs can be aggregated to form a single REPORT frame 730, which is sent upstream to trunk OLT 702.

Trunk OLT scheduler 732 within trunk OLT 702 uses the aggregated REPORT information included in REPORT frame 730 to generate GATE frame 704. Hence, from the point of view of the trunk PON, trunk OLT scheduler 732 receives REPORT frame 730, and generates GATE frame 704 accordingly. More specifically, REPORT frame 730 is an aggregated REPORT that includes multiple grants issued by bridge scheduler 722, and GATE frame 704 is an aggregated GATE that includes an extra large time window capable of satisfying the multiple grants issued by bridge scheduler 722.

GATE frame 704 arrives at an ONU MAC 708 located on bridge 710. ONU MAC 708 decomposes GATE frame 704 to extract the length information. GATE-conversion module 712 uses the extracted length information and the individual grants in REPORT queue 714 (which include grants generated by bridge scheduler 722) to split the length into multiple segments, and converts aggregated GATE frame 704 into multiple GATE frames, such as GATE frames 716 and 717, using the segments. More specifically, GATE-conversion module 724 matches LLIDs specified in the individual grants stored in REPORT queue 714 with the individual length segments, and generates new GATE frames by associating specific LLIDs with specific length segments. For example, a grant in REPORT queue 714 specifies a leaf LLID and a length. Accordingly, GATE-conversion module 724 generates a new GATE frame, which includes a grant of the specified length for the specified leaf LLID. The newly generated GATE frames are then sent downstream to leaf ONUs, each of which receives its own GATE based on the LLID specified by the GATE. In some embodiments, a grant in REPORT queue 714 is removed once a corresponding GATE frame is generated and transmitted downstream. In addition to GATE, trunk OLT 702 may transmit data downstream, which can be queued in downstream data queue 718.

Note that, because the upstream traffic is often oversubscribed, upstream bandwidth management is needed. In some embodiments, bridge 710 performs such a function. In further embodiments, the upstream data rate of individual users is controlled based on the upstream data queue status. More specifically, if the scheduling is performed by the generation of the aggregated REPORT, as shown in FIG. 7, bridge scheduler 722 is then required to track the grants issued in the loop, which is a common practice. Here the loop starts from the leaf ONU requesting bandwidth, to the trunk OLT issuing grant, and ends at the leaf ONU sending data upstream to the trunk OLT via the bridge. A grant is in the loop when it has been put into REPORT queue 714 for trunk REPORT frame 730. Accordingly, the number of grants in the loop and their lengths can be used to determine whether upstream data queue 728 is full, so that bridge scheduler 722 will not issue more grants than that can fill upstream data queue 728. Issuing too many grants than upstream data queue 728 can handle will result in loss of traffic.

During operation, bridge scheduler 722 tracks the amount of data scheduled that has not passed through upstream data queue 728, and only issues new grants if data in the loop is less than the size of upstream data queue 728. Once data leaves upstream data queue 728, there will be space for scheduler 722 to issue new grant and place the newly issued grants in REPORT queue 714. Note that a grant leaves REPORT queue 714 when a corresponding new GATE has been transmitted downstream. Because the upstream rate may cause the delay of data into upstream data queue 728, it will in turn limit the rate of the generation and transmission of REPORT frame 730 to trunk OLT 702, thus effectively limiting the granting rate.

Single domain scheduling with LLID aggregation, as shown in FIGS. 6-7, provides a number of advantages, including lessened delay and jitter, and enablement of a low-power, compact bridge chip. More specifically, this scheduling mechanism can be used to coordinate a single polling trigger for upstream, thus lessening the jitter. Moreover, LLID aggregation allows a two-stage network to support many more customers and LLIDs than the trunk side scheduler can support, because the trunk side scheduler no longer needs to know or schedule for all LLIDs in the leaf networks. This is a very important feature for a high-density, two-stage network.

Additionally, like the transparent bridge without LLID aggregation, this scheduling scheme with LLID aggregation also employs a single upstream queue, which provides huge savings to the bridge chip. By tracking the number of grants that are already in the loop, the scheduling scheme makes sure that only data that has a slot on the trunk network is granted to the leaf nodes. As a result, the bridge chip no longer needs hundreds of queues for the leaf LLIDs, nor a large external memory for buffering data from the many ONUs.

Note that, in addition to cascaded EPON networks, the bridge (shown in FIGS. 4A and 4B) and the single-domain secluding solutions (shown in FIGS. 5-7) can also be used in cascaded EPoC (Ethernet Protocol over Coax) networks. Exemplary cascaded networks may include a 10 G-EPON trunk connected to multiple 1 G-EPON leafs, 10 G-EPON to EPoC, 1 G-EPON to 1 G-EPON, 10 G-EPON to 10 G-EPON, etc. The key is the ability to link two schedulers that support multiple data rates.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. An apparatus for coupling between a trunk passive optical network (PON) and a leaf PON, comprising:
    a pluggable uplink module coupled to the trunk PON, wherein the pluggable uplink module conforms to a standard form factor and comprises a trunk-side optical transceiver for communicating with the trunk PON;
    a pluggable downlink module coupled to the leaf PON, wherein the pluggable downlink module conforms to a standard form factor and comprises:
        a leaf-side optical transceiver for communicating with the leaf PON;
        a single integrated circuit chip that includes an optical network unit (ONU) media access control (MAC) module, an optical line terminal (OLT) MAC module, and an on-chip memory; and
    a printed circuit board (PCB) coupling together the pluggable uplink module and the pluggable downlink module;
    wherein the OLT MAC module is configured to:
        disable a scheduler of the OLT MAC module;
        generate, while the scheduler of the OLT MAC is disabled, a leaf bandwidth-assigning frame for an ONU within the leaf PON by converting a trunk bandwidth-assigning frame received by the ONU MAC from the trunk PON; and
        send the leaf bandwidth-assigning frame to the ONU.

2. The apparatus of claim 1, wherein the pluggable uplink module includes one of:
    a small form-factor pluggable (SFP) optical transceiver;
    a quad SFP (QSFP) optical transceiver;
    an enhanced small form-factor pluggable (SFP+) optical transceiver; and
    a 10 Gigabit small form-factor pluggable (XFP) optical transceiver.

3. The apparatus of claim 1, wherein the pluggable downlink module has a standard form factor that is in compliance with one of:
    a small form-factor pluggable (SFP) specification;
    a quad SFP (QSFP) specification;
    an enhanced small form-factor pluggable (SFP+) specification; and
    a 10 Gigabit small form-factor pluggable (XFP) specification.

4. The apparatus of claim 1, wherein the trunk PON and the leaf PON are running at different data rates.

5. The apparatus of claim 1,
    wherein the trunk bandwidth assigning frame includes timing parameters relative to the trunk PON; and
    wherein while generating the leaf bandwidth-assigning frame, the OLT MAC module is configured to replace the timing parameters relative to the trunk PON with timing parameters relative to the leaf PON.

6. The apparatus of claim 5, wherein the OLT MAC module is further configured to:
    receive a leaf bandwidth-requesting frame comprising timing parameters relative to the leaf PON; and
    convert the leaf bandwidth-requesting frame to a trunk bandwidth-requesting frame comprising timing parameters relative to the trunk PON.

7. The apparatus of claim 5,
    wherein the OLT MAC module is further configured to:
        receive a data burst in response to the leaf bandwidth-assigning frame; and
        store the received data burst in an upstream data queue; and
    wherein the ONU MAC module is configured to:
        in response to determining that a bandwidth assignment included in the trunk bandwidth-assigning frame being valid based on the timing parameters relative to the trunk PON, send the data burst stored in the upstream data queue upstream to the trunk PON.

8. The apparatus of claim 1,
    wherein the ONU MAC module is configured to:
        receive, from the trunk PON, a bandwidth-assigning frame assigning bandwidth to multiple logical links in the leaf PON;
        extract a bandwidth assignment from the received bandwidth-assigning frame; and
        send the extracted bandwidth assignment to the OLT MAC module; and
    wherein the OLT MAC module is configured to:
        receive the extracted bandwidth assignment;
        divide the received bandwidth assignment into multiple new bandwidth assignments;
        generate multiple new bandwidth-assigning frames using the multiple new bandwidth assignments; and
        send the multiple new bandwidth-assigning frames to the multiple logical links.

9. The apparatus of claim 1,
    wherein the OLT MAC module is configured to:
        receive, from multiple logical links in the leaf PON, bandwidth-requesting frames;
        generate multiple bandwidth assignments corresponding to the bandwidth-requesting frames; and
        store the multiple bandwidth assignments into a bandwidth-assigning queue; and
    wherein the ONU MAC module is configured to:
        access the bandwidth-assigning queue;
        generate a single bandwidth-requesting frame based on the multiple bandwidth-assignments; and send the single bandwidth-requesting frame to the trunk PON.

10. The apparatus of claim 9, wherein the ONU MAC module is further configured to:
receive a single bandwidth-assigning frame in response to the bandwidth-requesting frame;
extract a bandwidth assignment from the bandwidth-assigning frame; and
generate multiple bandwidth-assigning frames based on the extracted bandwidth assignment and information included in the bandwidth-assigning queue.

11. The apparatus of claim 9, wherein the OLT MAC module is configured to:
receive data bursts from the multiple logical links;
store the received data bursts into a single upstream queue;
monitor status of the single upstream queue; and
in response to the single upstream queue being full, suspend generation of new bandwidth assignments.

12. The apparatus of claim 11, wherein the ONU MAC module is further configured to remove the multiple bandwidth-assignments from the bandwidth-assigning queue after sending the single bandwidth-requesting frame to the trunk PON, thereby allowing new bandwidth assignments to be generated and stored in the bandwidth-assigning queue.

13. A cascaded passive optical network (PON), comprising:
a trunk PON;
one or more leaf PONs; and
one or more bridges coupling the trunk PON to the one or more leaf PONs, wherein a respective bridge comprises:
a pluggable uplink module coupled to the trunk PON, wherein the pluggable uplink module conforms to a standard form factor and comprises a trunk-side optical transceiver for communicating with the trunk PON;
a pluggable downlink module coupled to the leaf PON, wherein the pluggable downlink module conforms to a standard from comprises:
a leaf-side optical transceiver for communicating with the leaf PON;
a single integrated circuit chip that includes an optical network unit (ONU) media access control (MAC) module, an optical line terminal (OLT) MAC module, and an on-chip memory; and
a printed circuit board (PCB) coupling together the pluggable uplink module and the pluggable downlink module;
wherein the OLT MAC module is configured to:
disable a scheduler of the OLT MAC module;
generate, while the scheduler of the OLT MAC is disabled, a leaf bandwidth-assigning frame for an ONU within the leaf PON by converting a trunk bandwidth-assigning frame received by the ONU MAC from the trunk PON; and
send the leaf bandwidth-assigning frame to the ONU.

14. The cascaded PON of claim 13, wherein the pluggable uplink module includes one of:
a small form-factor pluggable (SFP) transceiver;
a quad SFP (QSFP) optical transceiver;
an enhanced small form-factor pluggable (SFP+) transceiver; and
a 10 Gigabit small form-factor pluggable (XFP) transceiver.

15. The cascaded PON of claim 13, wherein the pluggable downlink module has a standard form factor that is in compliance with one of:
a small form-factor pluggable (SFP) specification;
a quad SFP (QSFP) specification;
an enhanced small form-factor pluggable (SFP+) specification; and
a 10 Gigabit small form-factor pluggable (XFP) specification.

16. The cascaded PON of claim 13, wherein the trunk PON and the leaf PON are running at different data rates.

17. The cascaded PON of claim 13,
wherein the trunk bandwidth assigning frame includes timing parameters relative to the trunk PON; and
wherein while generating the leaf bandwidth-assigning frame, the OLT MAC module is configured to replace the timing parameters relative to the trunk PON with timing parameters relative to the leaf PON.

18. The cascaded PON of claim 17, wherein the OLT MAC module is further configured to:
receive a leaf bandwidth-requesting frame comprising timing parameters relative to the leaf PON; and
convert the leaf bandwidth-requesting frame to a trunk bandwidth-requesting frame comprising timing parameters relative to the trunk PON.

19. The cascaded PON of claim 17,
wherein the OLT MAC module is further configured to:
receive a data burst in response to the leaf bandwidth-assigning frame; and
store the received data burst in an upstream data queue; and
wherein the ONU MAC module is configured to:
in response to determining that a bandwidth assignment included in the trunk bandwidth-assigning frame being valid based on the timing parameters relative to the trunk PON, send the data burst stored in the upstream data queue upstream to the trunk PON.

20. The cascaded PON of claim 13,
wherein the ONU MAC module is configured to:
receive, from the trunk PON, a bandwidth-assigning frame assigning bandwidth across multiple logical links in the leaf PON;
extract a bandwidth assignment from the received bandwidth-assigning frame; and
send the extracted bandwidth assignment to the OLT MAC module; and
wherein the OLT MAC module is configured to:
receive the extracted bandwidth assignment;
divide the received bandwidth assignment into multiple new bandwidth assignments;
generate multiple new bandwidth-assigning frames using the multiple new bandwidth assignments; and
send the multiple new bandwidth-assigning frames to the multiple logical links.

21. The cascaded PON of claim 13,
wherein the OLT MAC module is configured to:
receive, from multiple logical links in the leaf PON, bandwidth-requesting frames;
generate multiple bandwidth assignments corresponding to the bandwidth-requesting frames; and
store the multiple bandwidth assignments into a bandwidth-assigning queue; and
wherein the ONU MAC module is configured to:
access the bandwidth-assigning queue;
generate a single bandwidth-requesting frame based on the multiple bandwidth-assignments; and send the single bandwidth-requesting frame to the trunk PON.

22. The cascaded PON of claim 21, wherein the ONU MAC module is further configured to:
receive a single bandwidth-assigning frame in response to the bandwidth-requesting frame;
extract a bandwidth assignment from the bandwidth-assigning frame; and
generate multiple bandwidth-assigning frames based on the extracted bandwidth assignment and information included in the bandwidth-assigning queue.

23. The cascaded PON of claim 21, wherein the OLT MAC module is configured to:
receive data bursts from the multiple logical links;
store the received data bursts into a single upstream queue;
monitor status of the single upstream queue; and
in response to the single upstream queue being full, suspend generation of new bandwidth assignments.

24. The cascaded PON of claim 23, wherein the ONU MAC module is further configured to remove the multiple bandwidth-assignments from the bandwidth-assigning queue after sending the single bandwidth-requesting frame to the trunk PON, thereby allowing new bandwidth assignments to be generated and stored in the bandwidth-assigning queue.

* * * * *